UNITED STATES PATENT OFFICE.

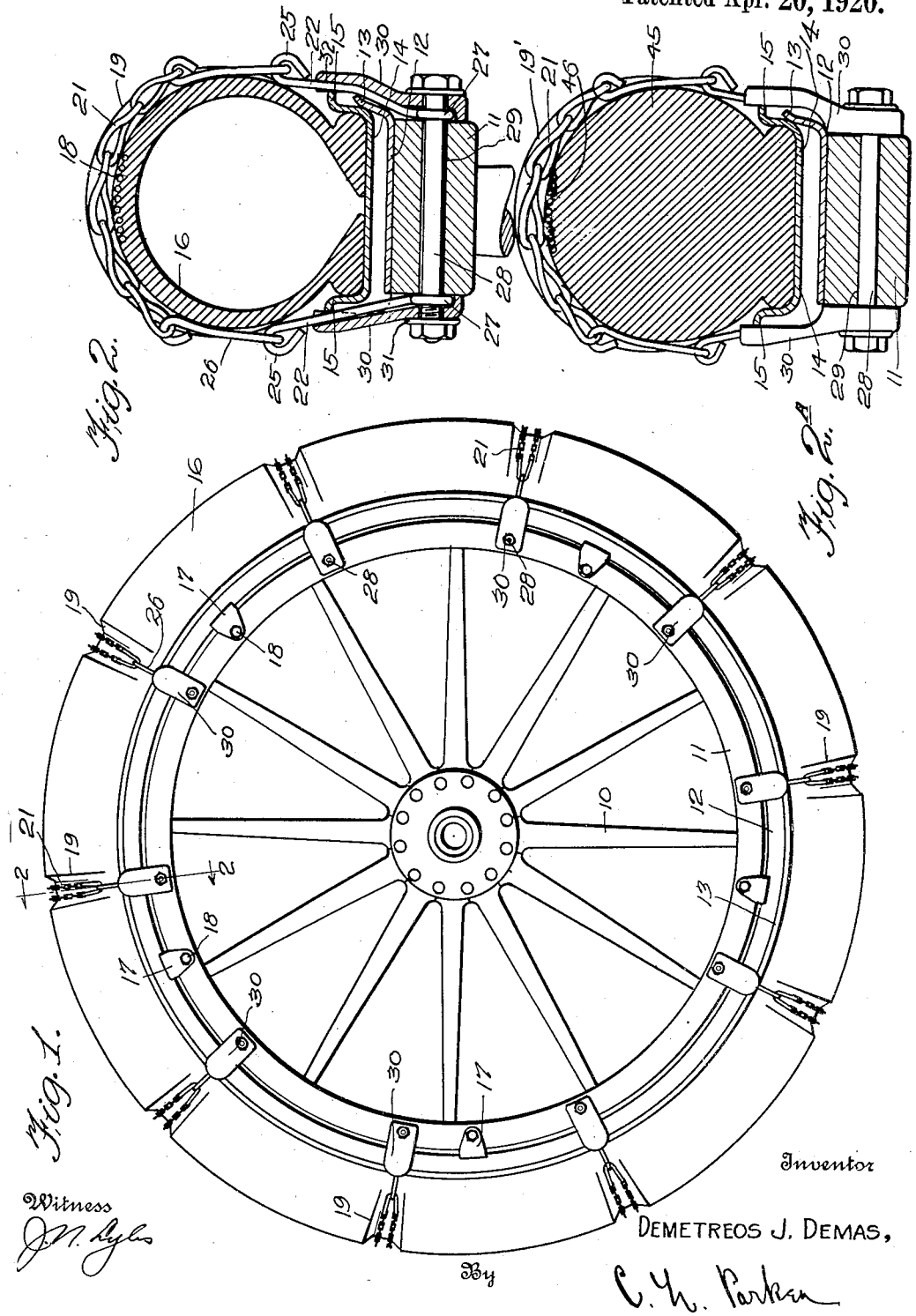

DEMETREOS J. DEMAS, OF PITTSBURGH, PENNSYLVANIA.

RESILIENT TIRE.

1,337,443. Specification of Letters Patent. Patented Apr. 20, 1920.

Application filed February 21, 1919. Serial No. 278,392.

*To all whom it may concern:*

Be it known that I, DEMETREOS J. DEMAS, a citizen of the United States, residing at Pittsburgh, in the county of Allegheny and State of Pennsylvania, have invented certain new and useful Improvements in Resilient Tires, of which the following is a specification.

My invention relates to resilient tires adapted for use upon self-propelled vehicles, while not necessarily restricted to such use.

An important object of the invention is to provide a resilient tire of the above mentioned character, which is equipped with anti-skidding means, such means being so arranged upon and secured to the tire that the tire is not injured by the same, as where the anti-skidding means are applied to a tire of ordinary construction.

A further object of the invention is to provide a tire of the above mentioned character, having flexible anti-skidding means, of the chain type, which are free from undue noise or rattling, in operation.

A further object of the invention is to provide means for securely holding the anti-skid means upon the tire.

Other objects and advantages of the invention will be apparent during the course of the following description.

In the acompanying drawings forming a part of this specification and in which like numerals are employed to designate like parts throughout the same, Figure 1 is a side elevation of apparatus embodying my invention.

Fig. 2 is a transverse sectional view taken on line 2—2 of Fig. 1.

Fig. 2ª is a cross-sectional view through a solid tire embodying the invention.

In the drawings wherein, for the purpose of illustration, is shown a preferred embodiment of my invention, the numeral 10 designates a wheel of an automobile or the like, having a felly 11. This felly is equipped with a metallic rim 12, rigidly secured thereto by any suitable means. This metallic rim 12 is provided at one edge with a flange 13, while its outer edge is straight, as shown. The rim 12 receives the demountable rim 14, having flanges 15. The rim 14 receives and holds the pneumatic tire 16. The rim 14 is held upon or within the rim 12 by spaced wedges or tapered blocks 17, secured to the felly 11 by bolts 18 or the like, as shown. This is the usual type of demountable rim for securing the pneumatic tire to the felly, and is shown simply for the purpose of illustrating the present invention, it being understood that such invention may be used in connection with any other form of rim.

In constructing my tire 16, I prefer to embed in the tread portion thereof, a plurality of flexible reinforcing elements 18, which may be in the form of cords, ropes or wires. These cords 18 form an internal armor, and prevent the chains, to be described, from injuring the tire. This armor also reinforces the tire, and prevents the same from being punctured. The tread portion of the tire is provided at spaced intervals with recesses 19, formed through the rubber portion thereof. These recesses extend transversely of the tire and radially of the same. The side walls 20 of these recesses are inclined, as clearly illustrated in Fig. 1. As clearly shown in Figs. 2 and 2ª, the bottom wall of the recess terminates near or adjacent the reinforcing elements 18, there preferably being a thin coating of rubber upon the cords 18 at this point.

I provide anti-skidding means which are arranged within these recesses 19, such means preferably consisting of flexible chain or chains 21. These chains extend longitudinally of the recess 19 and contact with the lower or bottom wall thereof, while their upper surfaces are substantially flush with the tread surface of the tire. Particular attention is called to the fact that these chains 21 contact with the bottom wall of the recess 19 and are virtually in contact with the reinforcing elements or cords 18, which serve to materially prevent the chains from wearing the tire, at the points of the recesses. Further, by having the outer portions of the chains substantially flush with the outer surfaces of the tread portion of the tire, excessive pressure is relieved from the chains, whereby the tendency of the chains to injure the tire is reduced, but the chains are still free to function in preventing slipping or skidding of the wheel.

In the drawings I have shown attaching means for holding the tread chains 21 in place, such attaching means being connected with the felly of the wheel. This attaching means includes a pair of elements 22, provided at their outer ends with hooks or eyes 25, engaging with U-shaped elements 26, engaging the ends of the chains 21, as shown. The elements 22 have their inner ends provided with eyes 27, to receive bolts 28, passing through transverse openings 29, formed in the felly. These bolts receive thereon covering plates or elements 30, apertured at 31. The plates 30 are provided with longitudinal grooves 32, interiorly thereof, receiving the elements 22, the plates conforming generally to the curvature of the rims 12 and 14, as shown.

From the foregoing description, it will be seen that in the use of the various attaching or connecting means, the chains are held in place within the recesses 19, in the tread portions of the tire and are allowed to function in the usual manner of the antiskidding chain.

In Fig. 2ª, the numeral 45 designates a solid rubber tire, provided with an internal armor 46. This tire is secured to the felly 28. The tire 45 is provided in its tread portion with recesses 19′ which are identical with the recesses 19. The chains 21 are arranged within these recesses and held therein by any of the attaching means shown and described in connection with the pneumatic tire.

It is thus seen that the invention may be applied to or embodied in a pneumatic or solid rubber tire, or employed in connection with any form of resilient tire.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, I claim:—

1. The combination with a tire provided with an internal armor and having a plurality of spaced transverse recesses formed in its tread portion, said recesses having their bottoms disposed adjacent the internal armor, transverse anti-skidding chains arranged within the recesses and engaging said armor, and means for retaining the chains within the recesses.

2. A pneumatic tire provided in its tread portion with an internal armor and having a transverse recess formed in the tread portion exteriorly of the armor, the armor being exposed at said transverse recess and a flexible antiskidding element held within said recess.

In testimony whereof I affix my signature.

DEMETREOS J. DEMAS.